US010393427B2

(12) United States Patent
Shuntich

(10) Patent No.: US 10,393,427 B2
(45) Date of Patent: *Aug. 27, 2019

(54) RAPID SPINNING LIQUID IMMERSION BEVERAGE SUPERCOOLER

(71) Applicant: Supercooler Technologies, Inc., Maitland, FL (US)

(72) Inventor: Douglas Shuntich, Maitland, FL (US)

(73) Assignee: Supercooler Technologies, Inc., Maitland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/790,269

(22) Filed: Oct. 23, 2017

(65) Prior Publication Data

US 2018/0045458 A1 Feb. 15, 2018

Related U.S. Application Data

(63) Continuation of application No. 14/298,117, filed on Jun. 6, 2014, now Pat. No. 9,845,988.
(Continued)

(51) Int. Cl.
*F25D 3/08* (2006.01)
*F25D 16/00* (2006.01)
*F25D 31/00* (2006.01)

(52) U.S. Cl.
CPC ............. *F25D 31/007* (2013.01); *F25D 3/08* (2013.01); *F25D 16/00* (2013.01); *F25D 31/002* (2013.01); *F25D 2303/081* (2013.01); *F25D 2400/28* (2013.01); *F25D 2400/36* (2013.01); *F25D 2400/361* (2013.01); *F25D 2700/00* (2013.01); *Y02A 40/968* (2018.01)

(58) Field of Classification Search
CPC ......... F25D 31/006–008; F25D 31/007; F25D 3/08; F25D 2303/081; F25D 2700/00; F25D 16/00; F25D 2400/36; F25D 2400/361; F25D 2400/28; F25D 31/002
See application file for complete search history.

(56) References Cited

U.S. PATENT DOCUMENTS 136,632 A 3/1873 Whipple
714,415 A * 11/1902 Trafford .................. F25D 3/06
366/214
(Continued)

FOREIGN PATENT DOCUMENTS

JP 2012153614 11/2012
KR 1020080088944 10/2008
(Continued)

OTHER PUBLICATIONS

Shields, New Refrigeration Tech Cools Drink in 45 seconds, Food & Drink International, 2014, www.fdiforum.net, 3 pages.
(Continued)

*Primary Examiner* — Kun Kai Ma
(74) *Attorney, Agent, or Firm* — Brian S. Steinberger; Law Offices of Brian S. Steinberger, P.A.

(57) ABSTRACT

Methods, processes, apparatus, kits and systems for chilling and cooling bottled or canned beverages, desserts, and food items to selected desired temperatures by rapidly rotating and counter-rotating the bottled or canned beverages, desserts, and food items that are immersed in cooled liquids in short time spans.

20 Claims, 6 Drawing Sheets

Related U.S. Application Data

(60) Provisional application No. 61/966,106, filed on Feb. 18, 2014.

(56) References Cited

U.S. PATENT DOCUMENTS

| | | | |
|---|---|---|---|
| 1,827,856 A | 10/1931 | Pope | |
| 1,854,731 A | 4/1932 | Beran | |
| 1,984,047 A | 12/1934 | Thieme | |
| 2,061,427 A * | 11/1936 | King | F25D 17/02 165/180 |
| 2,073,176 A | 3/1937 | Quinn | |
| 2,094,774 A | 10/1937 | Dawson | |
| 2,289,645 A | 7/1942 | Geistert | |
| 2,314,586 A | 3/1943 | Levison | |
| 2,375,944 A * | 5/1945 | Quentin | C03B 27/06 65/115 |
| 2,405,091 A * | 7/1946 | Culbreth | F25D 31/007 134/187 |
| 2,446,614 A | 8/1948 | Sherick | |
| 2,629,229 A | 2/1953 | Hull | |
| 2,687,619 A * | 8/1954 | Hurt | A47G 19/127 220/592.16 |
| 2,736,174 A * | 2/1956 | Tice | F25D 3/14 62/381 |
| 2,764,489 A | 9/1956 | Veazey | |
| 2,990,624 A | 7/1961 | Granath | |
| 3,065,553 A | 11/1962 | Olin | |
| D198,488 S | 6/1964 | Reis | |
| 3,284,991 A | 11/1966 | Ploeger | |
| 3,401,858 A | 9/1968 | White | |
| 3,434,410 A | 3/1969 | Galle | |
| 3,453,083 A | 7/1969 | Beerli | |
| 3,718,485 A | 2/1973 | Lankford | |
| 3,813,928 A * | 6/1974 | Anderson | G01N 5/045 73/76 |
| 3,860,166 A | 1/1975 | Anderson | |
| 3,915,285 A | 10/1975 | Lindquist | |
| 3,987,211 A | 10/1976 | Dunn | |
| 4,023,947 A | 5/1977 | Ferry | |
| 4,078,397 A * | 3/1978 | Brande | F25D 3/08 62/372 |
| 4,142,372 A | 3/1979 | Kato et al. | |
| 4,164,851 A * | 8/1979 | Bryant | F25D 3/02 62/381 |
| 4,172,365 A * | 10/1979 | McClintock | A45C 5/141 280/47.31 |
| 4,358,932 A * | 11/1982 | Helfrich, Jr. | F25D 17/062 62/126 |
| 4,358,934 A | 11/1982 | Vankirk | |
| 4,493,156 A | 1/1985 | Siegmann | |
| 4,549,409 A * | 10/1985 | Smith | F25D 3/08 62/381 |
| 4,580,405 A | 4/1986 | Cretzmeyer, III | |
| D293,758 S | 1/1988 | Balisteri | |
| 4,736,600 A | 4/1988 | Brown | |
| 4,813,243 A * | 3/1989 | Woods | F25D 3/08 366/235 |
| 4,825,665 A * | 5/1989 | Micallef | F25D 3/06 62/372 |
| 4,961,322 A | 10/1990 | Oguma et al. | |
| 4,979,994 A | 12/1990 | Dussault | |
| 5,144,816 A | 9/1992 | Chase | |
| 5,240,177 A | 8/1993 | Muramatsu et al. | |
| 5,269,156 A | 12/1993 | Van De Velde | |
| 5,282,368 A * | 2/1994 | Ordoukhanian | F25D 31/007 248/214 |
| 5,388,427 A | 2/1995 | Lee | |
| 5,477,623 A | 12/1995 | Tomizawa | |
| 5,505,054 A * | 4/1996 | Loibl | A23L 2/42 62/375 |
| 5,653,123 A | 8/1997 | Handlin | |
| 5,695,795 A | 12/1997 | Murray | |
| D392,514 S | 3/1998 | Steinfels | |
| 5,939,120 A | 8/1999 | Bogue | |
| 5,964,101 A | 10/1999 | Schulak et al. | |
| 5,966,964 A * | 10/1999 | Pattee | F25D 3/08 62/378 |
| 6,116,042 A | 9/2000 | Purdum | |
| 6,146,600 A | 11/2000 | Williamson | |
| 6,253,559 B1 | 7/2001 | Kinkel et al. | |
| 6,272,867 B1 | 8/2001 | Barrash et al. | |
| D449,763 S | 10/2001 | Harris, Jr. | |
| 6,314,751 B1 | 11/2001 | Gjersvik | |
| D455,607 S | 4/2002 | Johnson | |
| 6,413,444 B1 | 7/2002 | Kasza | |
| 6,543,154 B2 | 4/2003 | Horigane | |
| 6,662,574 B2 | 12/2003 | Loibl | |
| 6,691,530 B2 * | 2/2004 | Lee | F25D 3/02 62/378 |
| 6,730,341 B2 | 5/2004 | Ludwig | |
| 6,904,761 B2 | 6/2005 | Rafalovich et al. | |
| D508,719 S | 8/2005 | De Hass | |
| 6,945,069 B2 | 9/2005 | Lee | |
| 7,032,408 B2 | 4/2006 | Dentella et al. | |
| D540,126 S | 4/2007 | Leahy | |
| D552,417 S | 10/2007 | Ben-Shlomo et al. | |
| 7,296,422 B2 | 11/2007 | Strohm et al. | |
| D569,692 S | 5/2008 | Zell | |
| D574,128 S | 8/2008 | Meiry | |
| D614,442 S | 4/2010 | Smith | |
| 7,703,295 B2 | 4/2010 | Zangari et al. | |
| 7,707,848 B2 | 5/2010 | Loibl | |
| 7,712,321 B2 | 5/2010 | Kadyk | |
| 7,874,167 B2 * | 1/2011 | Kammer | A61F 7/0085 62/68 |
| 7,934,384 B2 | 5/2011 | Tuskiewicz et al. | |
| 7,997,094 B2 | 8/2011 | Zangari et al. | |
| D655,122 S | 3/2012 | Bingul et al. | |
| 8,132,960 B2 * | 3/2012 | Zhuang | A47J 43/042 366/209 |
| 8,225,620 B2 | 7/2012 | Prentner | |
| 8,434,317 B2 | 5/2013 | Besore | |
| 8,453,472 B2 * | 6/2013 | Pimputkar | F25D 29/00 62/126 |
| 8,534,085 B2 | 9/2013 | Zangari et al. | |
| 8,549,993 B2 | 10/2013 | Foster | |
| D705,607 S | 5/2014 | Zorovich et al. | |
| D707,497 S | 6/2014 | Tello | |
| 9,024,168 B2 | 5/2015 | Peterson | |
| 9,234,697 B2 | 1/2016 | Youn et al. | |
| D749,913 S | 2/2016 | Feng | |
| D778,687 S | 2/2017 | Shuntich | |
| 9,631,856 B2 | 4/2017 | Shuntich | |
| 9,845,988 B2 | 12/2017 | Shuntich | |
| 9,989,300 B1 | 6/2018 | Shuntich | |
| 10,149,487 B2 | 12/2018 | Shuntich | |
| D837,612 S | 1/2019 | Shuntich | |
| 2002/0124576 A1 * | 9/2002 | Loibl | F25B 21/04 62/64 |
| 2003/0090890 A1 | 5/2003 | Miozza et al. | |
| 2003/0192435 A1 | 10/2003 | McNair | |
| 2004/0103552 A1 | 6/2004 | Rhon | |
| 2004/0112413 A1 | 6/2004 | Brunner | |
| 2004/0144103 A1 * | 7/2004 | Lee | F25D 11/006 62/62 |
| 2004/0237544 A1 | 12/2004 | Ueno et al. | |
| 2005/0142268 A1 | 6/2005 | Scullion | |
| 2005/0166768 A1 | 8/2005 | Porat | |
| 2005/0217282 A1 | 10/2005 | Strohm et al. | |
| 2006/0090480 A1 * | 5/2006 | Loibl | F25D 3/08 62/64 |
| 2006/0185372 A1 | 8/2006 | Conde Hinojosa | |
| 2006/0191086 A1 | 8/2006 | Mourad | |
| 2006/0225439 A1 | 10/2006 | Morris, III | |
| 2006/0248904 A1 | 11/2006 | Ludwig | |
| 2006/0260345 A1 | 11/2006 | Coulter et al. | |
| 2007/0137223 A1 | 6/2007 | Brekke | |
| 2008/0016886 A1 | 1/2008 | Slate et al. | |
| 2008/0134695 A1 | 6/2008 | Loibl | |
| 2008/0141701 A1 * | 6/2008 | Lewis | F25D 3/08 62/381 |

(56) References Cited

U.S. PATENT DOCUMENTS

| | | |
|---|---|---|
| 2008/0196443 A1 | 8/2008 | Footer |
| 2008/0302114 A1 | 12/2008 | Kelly et al. |
| 2010/0133290 A1 | 6/2010 | Luntz et al. |
| 2010/0154452 A1 | 6/2010 | McCann |
| 2010/0205986 A1 | 8/2010 | Chung et al. |
| 2010/0218542 A1 | 9/2010 | McCollough et al. |
| 2010/0293970 A1* | 11/2010 | Mooijer ............... F25D 16/00 62/62 |
| 2010/0293971 A1* | 11/2010 | Loibl .................. A23L 3/10 62/64 |
| 2010/0319363 A1* | 12/2010 | Dieckmann ......... F25D 31/007 62/56 |
| 2011/0000229 A1* | 1/2011 | Boekhoorn ......... A47J 31/402 62/56 |
| 2011/0005265 A1* | 1/2011 | Edwards ............ F25D 31/007 62/465 |
| 2011/0308264 A1* | 12/2011 | Youn .................. F25D 17/062 62/159 |
| 2012/0047922 A1 | 3/2012 | Lee et al. |
| 2012/0106130 A1* | 5/2012 | Beaudette ......... A47G 23/0309 362/92 |
| 2012/0255321 A1* | 10/2012 | Cho .................. F25D 17/065 62/314 |
| 2012/0266619 A1 | 10/2012 | Shaw |
| 2012/0266627 A1* | 10/2012 | Lee ................... F25D 17/02 62/452 |
| 2013/0015753 A1 | 1/2013 | Son et al. |
| 2013/0029022 A1* | 1/2013 | Endo .................. A23L 2/40 426/477 |
| 2013/0055744 A1 | 3/2013 | Travers |
| 2013/0160987 A1 | 6/2013 | Grigorian |
| 2013/0171920 A1 | 7/2013 | Bhattacharya |
| 2013/0180280 A1* | 7/2013 | Grigorian ............ F25D 17/02 62/465 |
| 2013/0241386 A1 | 9/2013 | Kim et al. |
| 2013/0255304 A1 | 10/2013 | Cur et al. |
| 2013/0305752 A1 | 11/2013 | Martin |
| 2013/0312449 A1* | 11/2013 | Sundhar ............. F25D 31/007 62/344 |
| 2014/0125577 A1 | 5/2014 | Hoang |
| 2014/0216096 A1 | 8/2014 | Leclear et al. |
| 2014/0346942 A1 | 11/2014 | Kim et al. |
| 2014/0373567 A1 | 12/2014 | Otsuki et al. |
| 2014/0375198 A1 | 12/2014 | Jeon et al. |
| 2015/0059398 A1 | 3/2015 | Yoo et al. |
| 2015/0102717 A1 | 4/2015 | Furr et al. |
| 2015/0112451 A1 | 4/2015 | Dechev |
| 2015/0128483 A1 | 5/2015 | Krupp et al. |
| 2015/0198363 A1* | 7/2015 | Lee ................... F25D 31/007 62/377 |
| 2015/0233631 A1* | 8/2015 | Shuntich ............ F25D 31/007 62/64 |
| 2015/0264968 A1* | 9/2015 | Shuntich ............ A23G 9/045 99/275 |
| 2018/0135911 A1* | 5/2018 | Barnes ............... F25D 31/007 |

FOREIGN PATENT DOCUMENTS

| | | |
|---|---|---|
| KR | 1020100018887 | 2/2010 |
| WO | 0049347 | 8/2000 |
| WO | 2010042662 | 4/2010 |

OTHER PUBLICATIONS

Ultrasonic Degassing and Defoaming of Liquids, Hielscher—Ultrasound Technology, 2015, 4 pages.

Shuntich, D.J., PCT Serial No. PCT/US14/47214, International Search Report and Written Opinion, dated Nov. 20, 2014, 18 pages.

Shuntich, Supercooler Technologies, Inc., PCT Application No. PCT/US2015/034418 filed Jun. 5, 2005, Notification of Transmittal of the International Search Report and the Written Opinion of the International Searching Authority, or the Declaration dated Sep. 14, 2015, 15 pages.

Shuntich, D.J., PCT Serial No. PCT/US14/47214, filed Aug. 4, 2016, Notification Concerning Transmittal of the International Preliminary Report on Patent Ability (Chapter 1 of the Patent Cooperation Treaty) (PCT Rule 44bis.1 (c)), dated Aug. 4, 2016, 7 pages.

Shuntich, D.J., PCT Serial No. PCT/US2015/034418, filed Jun. 5, 2015, Notification Concerning Transmittal of International Preliminary Report on Patentability (Chapter I of the Patent Cooperation Treaty) (PCT Rule 44bis.1copyright), dated Dec. 15, 2016, 11 pages.

Shuntich, D.J., PCT Serial No. PCT/US2014047214, filed Aug. 19, 2016, The partial supplementary European search report, dated Aug. 18, 2017, 15 pages.

* cited by examiner

RAPID SPINNING LIQUID IMMERSION BEVERAGE SUPERCOOLER

This application is a Continuation of U.S. patent application Ser. No. 14/298,117 filed Jun. 6, 2014, now U.S. Pat. No. 9,845,988, which claims the benefit of priority to U.S. Provisional Application Ser. No. 61/966,106 filed Feb. 18, 2014. The entire disclosure of each of the applications listed in this paragraph are which is incorporated therein by specific reference thereto.

FIELD OF INVENTION

This invention relates to cooling and chilling beverages, desserts, and food items, and in particular to methods, processes, apparatus, kits and systems for chilling and cooling bottled or canned beverages, desserts, and food items to selected desired temperatures by rapidly rotating and counter-rotating the bottled or canned beverages, desserts, and food items that are immersed in cooled liquids in short time spans.

BACKGROUND AND PRIOR ART

Packaged-ice, such as different weights of bagged ice has been popular to be used in portable coolers to chill canned and bottled beverages. Packaged-ice has generally become standardized over the past decades with a few popular sizes in the U.S. and around the world dominating the sales. For example, the 10 lb bag of packaged-ice is the most popular retail version of packaged-ice in the U.S., followed in descending popularity by 20 lb, 8 lb, 7 lb and 5 lb bags of packaged-ice.

In Canada, the United Kingdom (UK), and other European countries, other standard sizes such as but not limited to 6 lb (2.7 kg), and 26.5 lb (12 kg) are also very popular forms of packaged-ice.

The bags of packaged-ice generally comprise loose ice cubes, chips and the like, that are frozen fresh water. The standard use of the bags of ice is having the consumer place the bag(s) loosely in cooler containers, and then adding canned and/or bottled beverages, such as sodas, waters to the coolers containing the packaged-ice.

Due to the melting properties of the fresh-water ice, canned and bottled beverages placed in ice cannot be chilled below 32 degrees Fahrenheit for any significant length of time, which is the known general freezing point.

Over the years the addition of ice-melters such as salt have been known to be used to lower the melting point of fresh-water ice. Forms of using salt have included sprinkling loose salt on packed-ice in a cooler to produce lower temperatures for certain canned and bottled beverages placed inside. Sprinkling salt has been tried with beer, since beer will not freeze at 32 degrees due to its alcohol content. However, the use of sprinkling loose salt has problems.

Due to the uneven spread of salt on ice, it is impossible to know or control precisely the resulting temperate below 32 degrees on various ice-cubes in the cooler obtained by sprinkling of salt. Salt sprinkling has inevitably resulted in some of the beverages "freezing hard" while others remain liquid and sometimes at temperatures above 32 degrees. As such, the spreading of salt or other ice-melters on packaged-ice in a cooler to obtain colder temperatures than 32 degrees is an impractical method to know and control precisely the resulting temperature of ice-cubes in a cooler environment.

Some recent trends in custom cold beverage creation at home and at commercial establishments rely on traditional refrigeration and/or placing ice inside the beverage to obtain cold temperatures. At home custom beverage creating devices such as SODASTREAM ° by Soda-Club (CO2) Atlantic GmbH, and KEURIG COLD™ by Keurig Green Mountain Inc. each rely on one of these traditional methods for cooling, and each of these devices having significant drawbacks.

Traditional refrigeration offers a relatively slow and inefficient method of cooling, requiring hours to obtain approximately 40 F drinking temperatures.

Placing ice inside a beverage, while providing very rapid cooling and 'ice-cold' temperature, has the drawbacks of; 1) watered-down flavoring, 2) introducing impurities, and 3) causing premature de-carbonation of carbonated beverages.

The non-traditional method of cooling canned and bottled beverages rapidly by spinning then on their longitudinal axis while the can or bottle is in contact with ice or 'ice-cold' liquid (usually fresh water at or near approximately 32 deg-F) has also been attempted. See for example, U.S. Pat. No. 5,505,054 to Loibl et al. This patent describes a rapid beverage cooling method and device that attempts to reduce beverage cooling times from hours to close to a minute without putting ice in the beverage.

Other devices, such as the SPINCHILL™ device, shown on the web at www.spinchill.com use portable type drills with a suction cup which can attach to one end of a canned beverage and claim 'cooling times' of 60 seconds or less for canned beverages spun at roughly 450 rpm in a standard ice-cooler containing ice and/or iced-water, though the term 'cooling' is used loosely and generally describes a beverage temperature between 40-50 F or thereabouts.

These non-traditional beverage cooling devices mentioned above and their techniques generally spin canned or bottled beverages at a constant rpm (revolutions per minute) rate in one-direction only. These devices generally expose surface are of the can or bottle over and over again to ice or cold liquid in order to rapidly cool the beverage.

These devices also seek to minimize agitation inside the canned or bottled beverage by spinning them at relatively mild rates of 350-500 rpm which, they claim, is optimal for rapid cooling and prevents undesirable foaming of carbonated beverages and beer.

These devices will still require a few to several minutes of spinning in a cooling medium in order to obtain 'ice-cold' drinking temperatures for the beverages, and have no automated way of communicating exactly when a beverage has reached its' optimal or lowest drinking temperature.

Moreover, none of these devices seek to maximize heat transfer coefficients (thereby minimizing cooling times) via utilization of 1) Liquid-immersion, 2) Turbulent fluid flow within the beverage container, and 3) Turbulent fluid-flow within the cooling medium.

It has been known for many years that alcoholic and non-alcoholic bottled and canned beverages of all varieties, including bottled water, can be super cooled below 32 deg-F while remaining liquid for short periods of time. What is not generally known is how to cool these beverages rapidly to precise super cooled temperatures which allow for enjoyable 'slush-on-demand' drinking experiences while preventing unwanted or premature freezing which can result in undesirable effects such as 1) premature foaming or release of carbonation in an undesirable way, and 2) hard frozen or 'chunky' frozen beverages which are difficult to consume.

In addition, the prior art generally does not have ability to supercool beverages below 32-degrees and/or below their own freezing point while keeping them in a liquid state to allow for previously impossible beverage options, such as creating instant milkshakes from super cooled milk beverages and creating instant smoothies from super cooled fruit and vegetable juices without the need to blend-in chopped-ice into the smoothie.

Thus, the need exists for solutions to the above problems with the prior art.

SUMMARY OF THE INVENTION

A primary objective of the present invention is to provide methods, processes, apparatus, kits and systems for chilling and cooling bottled or canned beverages, desserts, and food items to selected desired temperatures by rapidly rotating and counter-rotating the bottled or canned beverages, desserts, and food items that are immersed in cooled liquids in short time spans.

A secondary objective of the present invention is to provide methods, processes, apparatus, kits and systems for chilling and cooling bottled or canned beverages, desserts, and food items to selected desired temperatures, by automatically communicating exactly when a beverage has reached its' optimal or lowest drinking temperature.

A third objective of the present invention is to provide methods, processes, apparatus, kits and systems for chilling and cooling bottled or canned beverages, desserts, and food items rapidly to precise super cooled temperatures which allow for enjoyable 'slush-on-demand' drinking experiences while preventing unwanted or premature freezing which can result in undesirable effects such as 1) premature foaming or release of carbonation in an undesirable way, and 2) hard frozen or 'chunky' frozen beverages which are difficult to consume.

A fourth objective of the present invention is to provide methods, processes, apparatus, kits and systems to supercool beverages below 32-degrees and/or below their own freezing point while keeping them in a liquid state to allow for previously impossible beverage options, such as creating instant milkshakes from super cooled milk beverages and creating instant smoothies from super cooled fruit and vegetable juices without the need to blend-in chopped-ice into the smoothie.

The invention provides preferred embodiments for beverage cooling to range of 15 deg-F to 26 deg-F allowing for a wide variety of alcoholic and non-alcoholic bottled and canned beverages to be super cooled (from room temperature)—remaining in liquid form—in as little as 10 to 20 seconds in some cases (less or more depending on size and type of container and liquid immersion temperatures).

In addition to supercooling, the invention allows for the rapid and precise cooling into any temperature range desired by maximizing heat-transfer coefficients across multiple regions of the cooling system.

By maximizing the heat transfer coefficients of the entire beverage cooling system via a sub-cooled liquid immersion medium and turbulent flow in both the beverage container and the liquid immersion medium, the invention is able to minimize beverage cooling times in order to make it practical to incorporate the technology into a vending environment, a bar, or a household or portable beverage supercooling device.

The addition of temperature sensors that are in contact with the beverage container and/or the liquid immersion medium and in communication with a 'smart' electronic timer allows the present invention to inform and/or alert the user to the exact time required and precise temperature obtained (within approx. +/−1 or 2 deg-F) within the beverage container.

To create turbulent flow within the beverage container and simultaneously prevent unwanted nucleation during cooling (either nucleation of the carbonation within the liquid or nucleation-freezing of the liquid) the beverage container such as a cylindrical can, and the like, can be spun on axis in a vertical position at very high RPM (generally >1000 RPM, and potentially as high as 10,000 RPM or more) for short periods of time (generally less than 1 second, but can be more or less) and then spun in the reverse direction for an equally short period of time.

This process can be repeated until the desired and selected temperature is reached inside the beverage container. This rapid spinning and reversing direction process greatly improves heat transfer and thus greatly reduces beverage cooling times compared to the prior art.

Moreover, prior art patents (see for example, U.S. Pat. No. 5,505,054 to Loibl et al., which is incorporated by reference suggest an inverse relationship between cooling times and higher RPM when spinning above 345-400 RPM, which indicates an incomplete understanding of heat transfer inside the canned or bottled beverages which is misleading, limiting, and would not have led to the present invention or discovery.

For another embodiment, in order to create turbulent flow within the liquid immersion medium, one or more high-volume liquid pumps can be activated in concert with the directional spinning of the beverage container to create turbulent flow and maximize heat transfer away from the beverage container into the liquid medium.

By maximizing heat transfer coefficients and reducing cooling time, this method becomes an energy-efficient way to cool individual canned or bottled beverages rapidly, offering energy-efficiency advantages over larger air-based refrigerated systems that require hours of run-time to cool a few beverages.

Further objects and advantages of this invention will be apparent from the following detailed description of the presently preferred embodiments which are illustrated schematically in the accompanying drawings.

DESCRIPTION OF THE PREFERRED EMBODIMENTS

Figure 1:
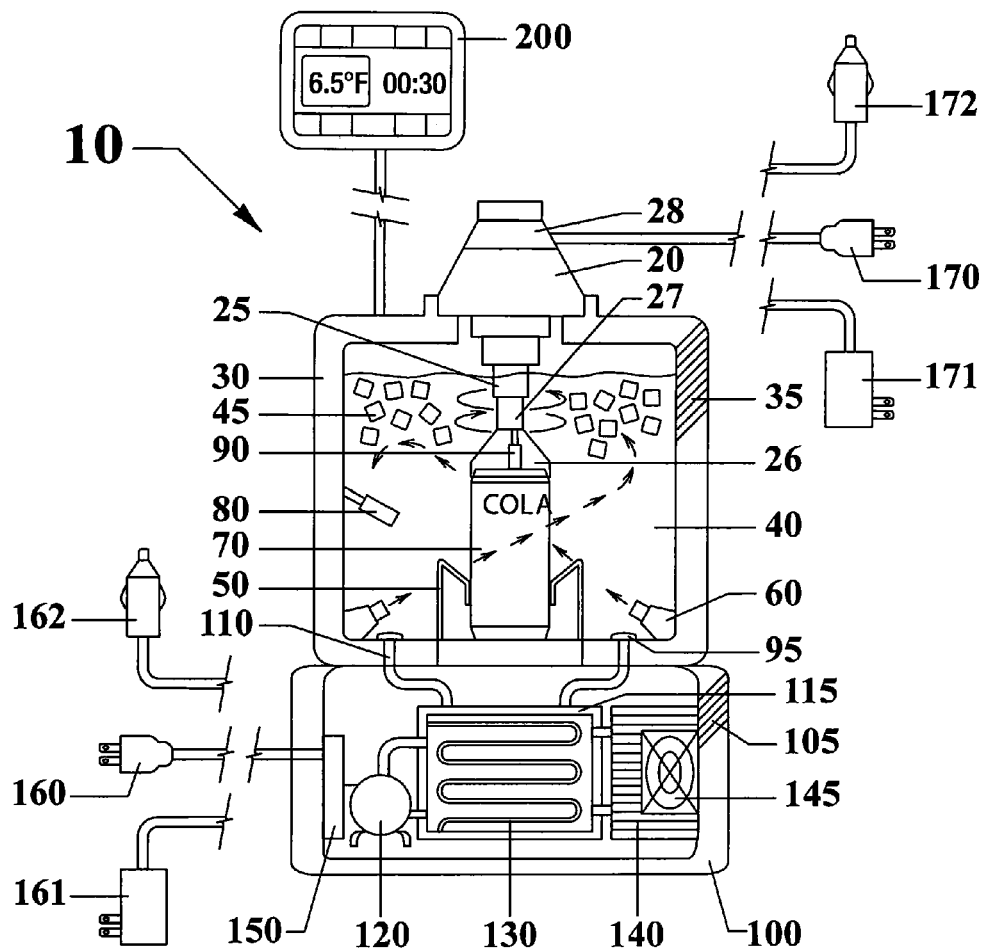
FIG. 1 is a partially cut-away view of a rapid-spinning liquid-immersion single-beverage supercooler with high-speed motor and spinning apparatus, insulated liquid-immersion cavity, optional self-contained refrigeration and heat-transfer system, high-flow liquid turbulence pumps, temperature sensors, digital control(s) and various power adapters.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The present invention will now be described more fully hereinafter with reference to the accompanying drawings, in which preferred embodiments of the invention are shown. Unless otherwise defined, technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below.

Any publications, patent applications, patents, and other references mentioned herein are incorporated by reference in their entirety. In case of conflict, the present specification, including any definitions, will control. In addition, the materials, methods and examples given are illustrative in nature only and not intended to be limiting. Accordingly, this invention may be embodied in many different forms and should not be construed as limited to the illustrated embodiments set forth herein. Rather, these illustrated embodiments are provided solely for exemplary purposes so that this disclosure will be thorough and complete, and will fully convey the scope of the invention to those skilled in the art. Other features and advantages of the invention will be apparent from the following detailed description and from the claims.

A list of the components will now be described.
10 Rapid-Spinning Liquid-Immersion Beverage Super-cooler Apparatus
20 Motor head (high speed motor)
25, 26 Beverage-holder assembly
28 single or dual rechargeable battery
30 Thermally insulated liquid immersion cavity
40. Liquid immersion medium
45. Ice
50 Lower beverage container holder
60 Liquid turbulence pumps
80 Liquid immersion temperature sensor
90 Beverage container temperature sensor
95 heat-transfer plugs
100 Self contained refrigeration and heat exchange system/unit
120 compressor
130 evaporator
140 condenser
150 battery system
160, 170 electrical connections
161 wall-plugged transformer
162 12V automotive cigarette-light adapter
171 wall-plugged transformer
172 12V automotive cigarette-light adapter
200 Interface microcontroller mechanism
310 rapid-spinning liquid-immersion single-beverage super-cooler
320 bi-directional motor
330 glass or plastic liquid immersion cavity
400 Self-contained refrigeration unit
480 Multiple beverage unit
485 Telescoping support
500 Timer
510 Circuit board
520 Display
530 liquid medium temperature
540 countdown timer
550 temperature
560 container size
570 starting drink temperature
580 Start-end button
590 Reset button
600 container position selection
610 up and down arrow selections
620 turbo-pump on/off selection
630 bag or membrane use selection
700 Timer apparatus
710 self-contained case
715 self-contained case
725 rechargeable battery and connectors
730 protective transparent lid
740 mounting bracket
750 precision temperature probe
760 pump
770 standardized jack
780 Connector
790 Power adapter TABLE 1 illustrates the obtained supercool temperatures and rapid cooling times of various canned and bottled beverages (between 8 oz and 16 oz) starting at a room temperature of approximately 75 F (approximately 24.0 C) using a prototype of a preferred embodiment of the present invention rotating at 2500 rpm (which can include approximately 2500 rpm) and switching directions every 0.65 seconds (which can include approximately 0.65 seconds). The term approximately can include +/−100.

These cooling times and temperatures are significantly faster and lower than those mentioned in referenced in the prior art, such as those described in U.S. Pat. No. 5,505,054 to Loibl et al., and have no undesirable 'side-effects' of pre-released carbonation or foaming.

TABLE 1

| Container Type/Size | Final Beverage Temp | Time (Seconds) |
|---|---|---|
| 8 oz Plastic Bottles | 18 F. (−7.8 C.) | 40 sec |
|  | 22 F. (−5.6 C.) | 35 sec |
| 8 oz Cans | 18 F. (−7.8 C.) | 20 sec |
|  | 22 F. (−5.6 C.) | 16 sec |
| 12 oz Cans | 18 F. (−7.8 C.) | 24 sec |
| 12 oz Cans | 22 F. (−5.6 C.) | 18 sec |
| 16 oz Cans | 18 F. (−7.8 C.) | 32 sec |
| 16 oz Cans | 22 F. (−5.6 C.) | 25 sec |
| 12 oz Plastic Bottles | 18 F. (−7.8 C.) | 55 sec |
| 12 oz Plastic Bottles | 22 F. (−5.6 C.) | 45 sec |
| 16 oz Glass Bottles | 22 F. (−5.6 C.) | 95 sec |

TABLE 2 illustrates the obtained supercool temperatures and rapid cooling times of various canned and bottled beverages (between 20 oz and 2 Liters) starting at a room temperature of approximately 75 F (approximately 24.0 C) using a prototype of a preferred embodiment of the present invention rotating at 2500 rpm (which can include approximately 2500 rpm) and switching directions every 0.65 seconds (which can include approximately 0.65 seconds). The term approximately can include +/−10%. These cooling times and temperatures have no undesirable 'side-effects' of pre-released carbonation or foaming.

TABLE 2

| Container Type/Size | Final Beverage Temp | Time (Seconds) |
|---|---|---|
| 20 oz Plastic Bottles | 18 F. (−7.8 C.) | 75 sec |
|  | 22 F. (−5.6 C.) | 60 sec |
| 20 oz Cans | 18 F. (−7.8 C.) | 45 sec |
|  | 22 F. (−5.6 C.) | 35 sec |
| 32 oz Plastic Bottles | 18 F. (−7.8 C.) | 95 sec |
|  | 22 F. (−5.6 C.) | 80 sec |
| 64 oz Plastic Bottles | 18 F. (−7.8 C.) | 150-210 sec |
|  | 22 F. (−5.6 C.) | 120-280 sec |
| 2 Liter Plastic Bottles | 18 F. (−7.8 C.) | 300 sec |
|  | 22 F. (−5.6 C.) | 260 sec |

TABLE 2 can also be used for other larger beverage containers, such as but not limited to 48 oz, 1 liter and 3 liter plastic bottles, and the like. Additionally, different glass bottles having the sizes listed in the above tables can also be included.

TABLES 1 and 2 can include the specific temperatures an times listed. Additionally, each of the listed specific temperatures and times can be each include approximately in front of the listed temperatures and times, where approximately can include +/−10%.

The times listed in TABLES 1 and 2 are from room temperature to the final temperature. Each of the times listed in both the listed times and in approximately the listed times can be reduced at least half, if the initial temperature is from a refrigerated temperature of approximately 34 F to the supercooled temperature.

While the switch times between rotating and counter-rotating has been tested at 0.65 seconds (including approximately 0.65 seconds), the invention can be practiced with different values of rpm (revolutions per minute) and switch times as illustrated in TABLE 3.

TABLE 3

| Operating Parameter | Broad Range | Narrow Range | Preferred |
|---|---|---|---|
| Rotation (RPM) | 500-10,000 | 1,000-5,000 | 2,500 |
| Switch Time (Sec) | 1/10-2 | 3/10-1 | 0.3-0.7 |

While the rpm and seconds list specific values, each of the values can include approximately those values, where approximately includes +/−10%.

The operating parameters of rpm and switch times can also be used with the alternatively rotating and counter-rotating of the various beverage containers referenced in TABLES 1 and 2, and can include additional applications for chilling of beverage containers. For example, a beverage container being rotated at approximately 1,000 rpm can be switched between rotations and alternative rotations at switch times of approximately 3/10 of a second per rotation.

The beverage container rotations in TABLES 1, 2 and 3 can include the beverage containers initially being alternatively rotated between clockwise (CW) and counter-clockwise (CCW), by starting at clockwise (CW) or starting at counter-clockwise (CCW).

FIG. 1 is a partially cut-away view of a rapid-spinning liquid-immersion single-beverage supercooler with high-speed motor and spinning apparatus, insulated liquid-immersion cavity, optional self-contained refrigeration and heat-transfer system, high-flow liquid turbulence pumps, temperature sensors, digital control(s) and various power adapters. It shows a high-rpm (revolutions per minute) motor mounted at the top capable of rapidly spinning the beverage and rapidly changing the direction of spin. Support, holding/retaining mechanisms for various sized canned and bottled beverages are also shown.

Figure 2:
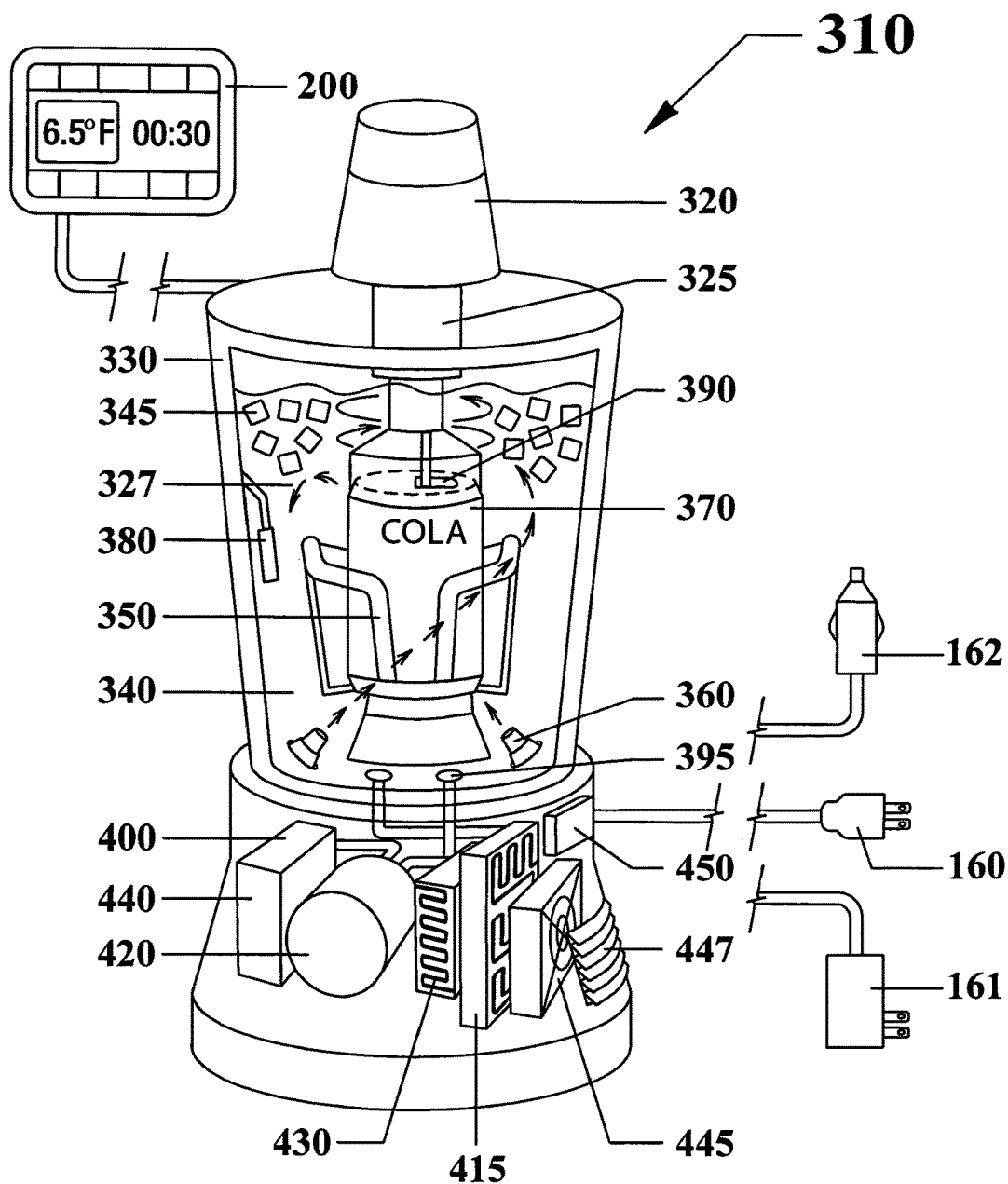
FIG. 2 is a partial see-through view of a preferred embodiment of a rapid-spinning liquid-immersion single-beverage supercooler with a top-mounted high-rpm motor, a double-walled 'clear' plastic or glass liquid immersion cavity, an optional bottom-mounted self-contained refrigeration and heat-transfer system, high-flow liquid turbulence pumps, temperature sensors, digital control(s) and various potential power adapters.

FIG. 2 is a partial see-through view of a preferred embodiment of a rapid-spinning liquid-immersion single-beverage supercooler with a top-mounted high-rpm motor, a double-walled 'clear' plastic or glass liquid immersion cavity, an optional bottom-mounted self-contained refrigeration and heat-transfer system, high-flow liquid turbulence pumps, temperature sensors, digital control(s) and various potential power adapters.

FIGS. 1-2 illustrate a Rapid-Spinning Liquid-Immersion Beverage Supercooler Apparatus 10 and its associated methods according to the present invention. In a first preferred embodiment, as shown in FIG. 1, the device can include a rapid spinning bi-directional motor head 20, beverage holder assembly 25, 26, a thermally insulated liquid immersion cavity 30, and an immersion cooling/chilling medium 40.

The immersion cooling/chilling medium 40 can include a cooling liquid or substance 45, such as but not limited to ice and water, and/or water saline solution, and/or propylene glycol and water mix, and/or vegetable glycerin and water mix, and/or any glycol mix, and/or glycerin plus water mix, and/or a non-toxic liquid anti-freeze similar to anti-freeze blend such as described in the "Ice-Accelerator Aqueous Solution" U.S. patent application Ser. No. 14/163,063 filed Jan. 24, 2014 to the same inventor as the subject invention, which is incorporated by reference in its' entirety.

TABLE 4 shows the various temperatures that can be used for the liquid cooling medium or substance.

TABLE 4

| LIQUID COOLING MEDIUM/SUBSTANCE TEMPERATURES | | |
|---|---|---|
| Broad Range | Narrow Range | Preferred |
| −20 F. to +34 F. | −5 F. to +32 F. | +5 F. to +20 F. |

The number values in TABLE 4 can include the exact number values listed. Additionally, each of the number values can be approximately those values, where the term approximately includes +/−10%.

The liquid immersion temperatures below −3 F can very difficult to work with due to premature freezing of contents inside canned containers. Also, some embodiments (for example in a commercial and/or vending machine application of this invention) will seek to minimize time of cooling by using liquid immersion temperatures on the lower end (such as near 0 F), while home units can benefit from using Liquid Immersion temperatures nearer to the desired supercooling temperatures of 15 F to 18 F in order to allow a supercooled beverage to remain in the liquid indefinitely (after it has been supercooled) without the risk of freezing.

In other words, a home apparatus unit (such as those described in this application) can be designed in a way that slightly sacrifices speed of supercooling in order to allow for a secondary function (indefintite stay inside the machine) of the supercooled beverage.

Referring to FIGS. 1-2, the device 10 can further include a lower beverage container holder 50, one or more high-volume liquid "turbulence" pumps 60, a liquid immersion temperature sensor 80 which is in communication with the user interface microcontroller mechanism 200, an optional beverage container temperature sensor 90, which can be in communication with the user interface controller.

The device 10 can further include an optional self-contained refrigeration and heat exchange system 100, which can include a compressor 120-condenser 140 evaporator 130 refrigeration system in series. The motor 20 and compressor 120 can be D/C (direct current) electronic devices, a single or dual rechargeable battery 28, 150 system can be used to power the entire apparatus. Alternatively the motor and compressor can be A/C (alternating current) powered via standard electrical outlets.

Electrical connections comprising standard A/C power are shown as item 160 and 170, whereas D/C power connections are shown as wall-plugged transformers 161 and 171 and/or 12V automotive cigarette-lighter adapters 162, 172.

The method of operation can involve 1) first filling the liquid immersion cavity with cooling liquid or substance 45, Such as but not limited to ice and/or water saline solution, and/or propylene glycol and water mix, and/or vegetable glycerin and water mix, and/or any glycol and/or glycerin plus water mix, and/or a non-toxic liquid anti-freeze similar to anti-freeze blend such as described in the "Ice-Accelerator Aqueous Solution" U.S. patent application Ser. No. 14/163,063 filed Jan. 24, 2014 to the same inventor as the subject invention, which is incorporated by reference in its' entirety.

The cooling liquid in the liquid immersion cavity can be used to obtain a desired liquid medium temperature that is many degrees below freezing (32 F).

If the optional self-contained refrigeration unit 100 is attached, it will be turned-on and the heat-transfer plugs 95 will be removed so the liquid can flow through the heat transfer system via a pump (not shown) in the refrigeration unit to cool the liquid immersion medium. This is required if ice is not used in the liquid immersion medium, but optional when ice is used. In the drawing in FIG. 1, a liquid immersion medium temperature of 6.5 F is shown on the touch-screen user interface control 200.

2) Next the user selects the desired supercool (or non-supercool) temperature for the beverages to attain, the size and type of beverage (drawing depicts a standard 12 oz canned beverage), the starting temperature of the beverage, and removes the motor head and beverage holding apparatus (20, 25, 26, 28, 90) and places a beverage container in the holder. The touch-screen timer, which can be an app on a cell-phone or other electronic device, such as but not limited to a laptop computer, personal computer, and the like, and operated remotely via wireless connection (not shown) will show the estimated time for cooling the beverage to the desired drinking temperature selected. The drawing depicts an estimated time of 30 seconds. Note: specialized beverage containers (not shown) that are designed to work with the present invention for home-made or custom mixed beverages that are not manufactured in disposable containers are part of the present invention and may be sold with the device or sold separately.

3) Next the user places the beverage container in the holder 26 and inserts the beverage down into the liquid immersion medium where it is held in place via the tension spring appendages 50. Note: the center area where the beverage is inserted may be protected with a screen-like cylindrical mesh (not shown) that keeps ice cubes out of the center area for easy insertion and ease of operation during rapid spinning. The mesh must allow the free-flow of liquid immersion medium into and away-from the beverage container. An optional switch (not shown) at the bottom of the beverage tension spring apparatus 50 may be used to communicate with the controller that a beverage is in the system and ready for cooling.

4) Next the user presses 'go' or 'start' or other begin-cooling command on the user interface 200 and the device automatically spins the beverage and rapidly reverses direction over and over according to the microcontroller algorithms. When the timer is complete, the device automatically stops spinning and alerts the user that the beverage has reached the desired temperature and the operation is complete. In the case of supercooling, it is possible the device can be equipped with an automatic telescoping base (as shown in FIGS. 3-4) to rapidly eject the cooled beverage from the liquid immersion medium to prevent nucleation (freezing) of the beverage.

5) Finally the user removed the beverage from the liquid immersion medium (if it has not been automatically lifted or ejected), removed the container from the holding apparatus and opens the beverage container for consumption. In the case of supercooling, the beverage will provide a "slush-on-demand" effect when nucleated via a variety of means such as slamming on a table or inserting a very small piece of ice into the beverage. The system is then ready to be used again, and will be capable of cooling and/or supercooling dozens or more standard beverages in any given outing with or without electricity (if ice is used and/or batteries are charged) and should be constantly ready for use at a moments' notice.

FIG. 2 shows another preferred embodiment of the present invention 310 with a top-mounted high-speed bi-directional motor 320, and other systems similar to those in FIG. 1. Of note is the clear, double-walled (or triple-walled) glass or plastic liquid immersion cavity 330, and a "see-through" self-contained refrigeration unit 400.

Figure 3:
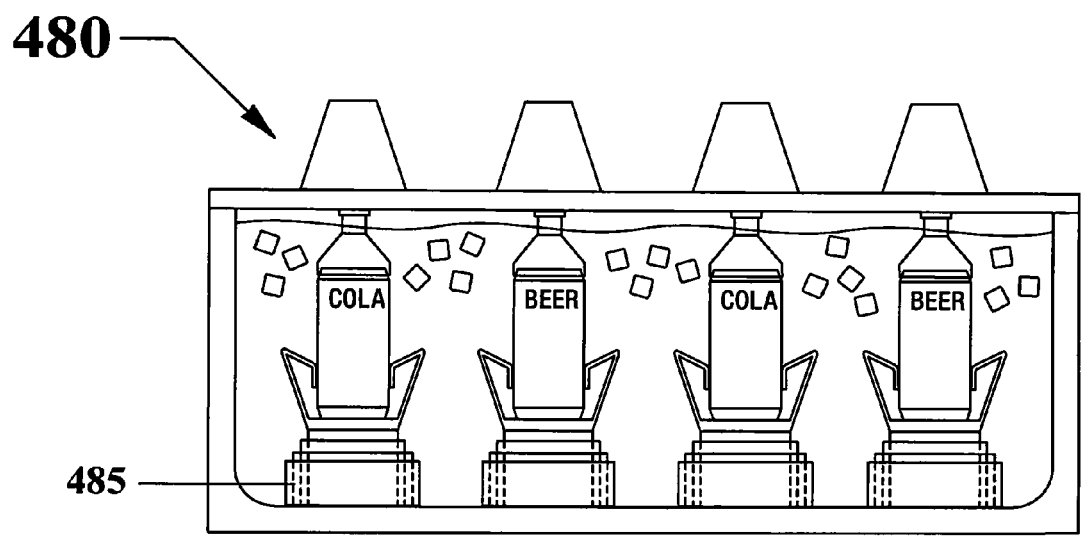
FIG. 3 is a cross-sectional view of a multiple beverage rapid-spinning liquid-immersion supercooler.
Figure 4:
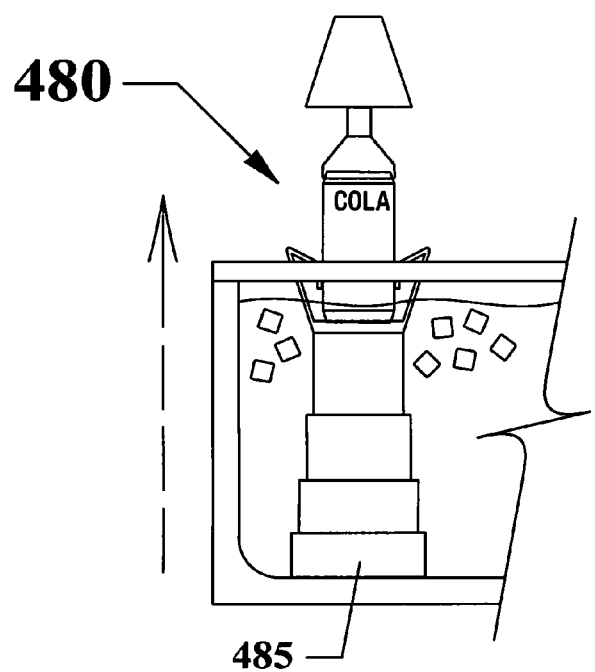
FIG. 4 shows the potential telescoping base for automatic rapid beverage ejection from the liquid cooling medium.

FIG. 3 shows a multiple beverage unit 480 similarly designed to the apparatus in FIG. 1, but with the capability to simultaneously rapidly cool several different and varying sized beverage containers in the same liquid immersion medium. For simplicity, the drawing leaves out many of the detailed components shown in FIG. 1. An optional telescoping support 485 below the beverage containers can be used to rapidly and automatically eject the beverages from the liquid immersion medium in order to prevent freezing (nucleation) of the beverages if left in the liquid immersion medium after supercooling is complete. FIG. 4 shows the telescoping support 485 being fully extended.

Figure 5:
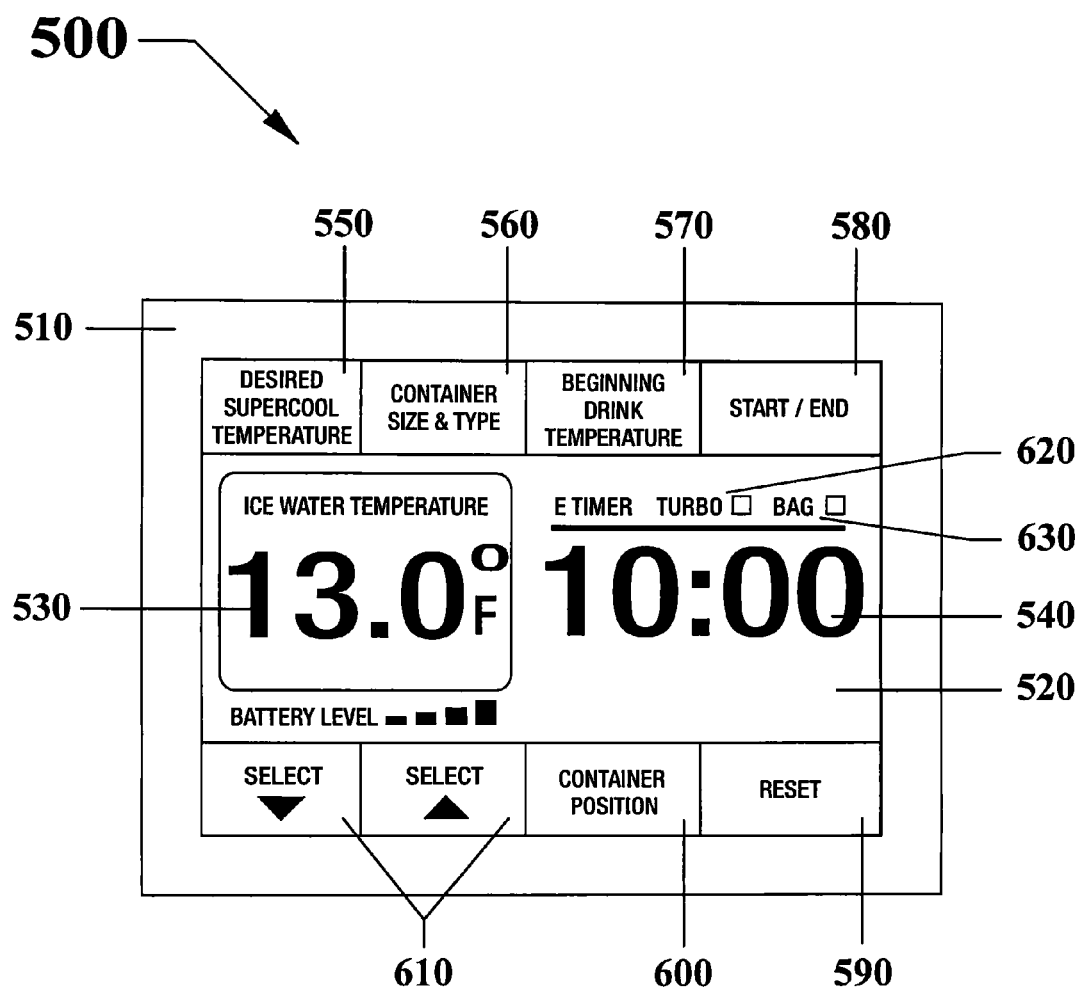
FIG. 5 shows a touch screen timer user interface containing various inputs, selections, and sensory outputs on a user control interface.
Figure 6:
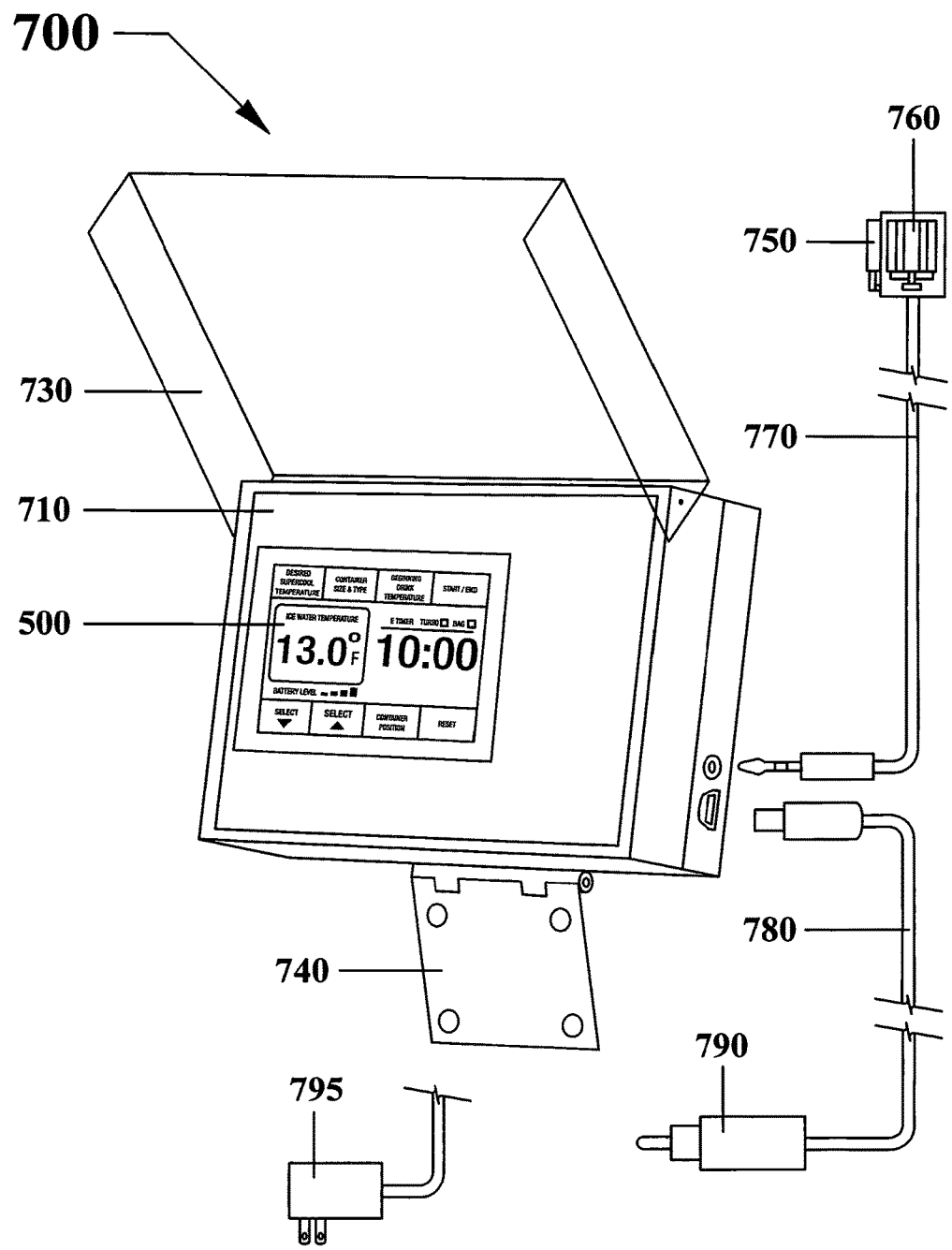
FIG. 6 shows a self-contained touch-screen timer user interface containing electrical connections, battery, protective case and cover, attaching bracket, and temperature sensor with mini-pump.
Figure 7:
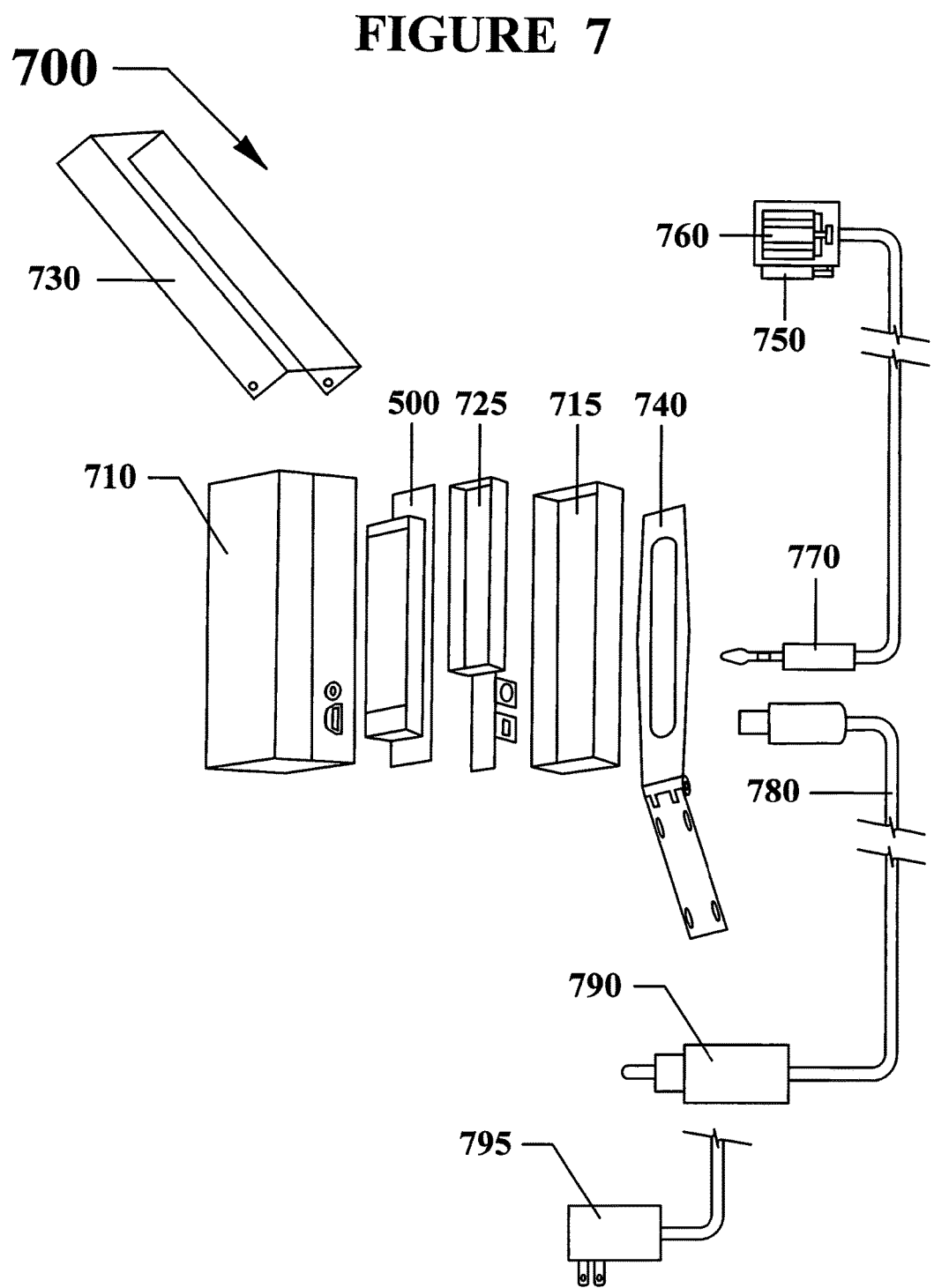
FIG. 7 is an exploded-view of a self-contained touch-screen timer user interface similar to that shown in FIG. 6.

FIGS. 5, 6 and 7 illustrate preferred embodiments of a built-in or self-contained touch-screen user-interface supercooling Timer 500, 700, their methods and designs. The apparatus 500 described in FIG. 5 is meant to show possible displayed input selections and outputs of a supercooling user-interface timer control and display utilizing built-in electronics and algorithms. The user interface of the present invention can contain more, less, or other inputs, selections and outputs than depicted.

The device can contain a circuit board 510 and a touch screen display 520. The touch-screen display can contain a variety of user selected inputs such as the desired supercool temperature 550, the container size and type 560, the starting drink temperature 570, the start-end button 580, a reset button 590, a container position selection 600, up and down arrow selections 610, a turbo-pump on/off selection 620, a bag or membrane use selection 630, and other selections as required. The outputs to the user interface may include a display of the liquid medium temperature 530, a countdown timer 540, a battery level indicator (if appropriate) and a container position indicator (not shown).

The timer apparatus 700 described in FIGS. 6 and 7 includes the entire touch-screen display 500 described in FIG. 5 set into a self-contained case 710, 715 with protective transparent lid 730, rechargeable battery and connectors 725, a mounting bracket 740, a standardized power adapter and connector 790, 780, and standardized jack 770 and precision temperature probe 750 and small pump 760. The small pump is turned-on periodically via control software algorithms to time the operating of the pump to maximize turbulence within the liquid immersion medium. For example, pumps can create more turbulence in liquid immersion mediums.

The software algorithms can control the pumps to stir the liquid medium around the temperature probe for several seconds prior to taking a temperature reading in the case of stagnant liquid medium.

The apparatus may contain an audible alarm (not shown) to alert users of certain conditions including "timer-done" activity and/or the ability to automatically turn on/off the spinning motor head, change speeds or rpm, and automatically remove the beverage from the liquid cooling medium.

The software algorithms contained in micro processors (computer) in the apparatus can be capable of calculating the amount of time required to attain the desired supercooling temperature for the beverages based on a number of inputs including the liquid medium temperature and those listed above and/or others.

The software algorithms in the computer can change rotation speeds, switching times based on size and type and shape of the beverage containers (cans or bottles, plastic or glass, different shapes (cylindrical, bottle, square, rectangular), and the desired final temperatures starting from either room temperature or refrigerated temperature that can include approximately 34 F.

The apparatus may be manufactured as an integral part of the various liquid-immersion beverage supercooling devices mentioned in the present invention or may be manufactured as a stand-alone device to be used in any standard beverage cooler.

While the preferred embodiments show containers being bottles and cans, the invention can be used to rapidly cool and chill other other shaped containers, such as square, rectangular, triangular, and the like.

Although the preferred embodiments describe rapidly cooling beverages, the invention can be used to rapidly cool and chill desserts, and food items, and the like.

Although the preferred embodiments have the beverage containers being chilled to be mounted by being immersed in a housing of cooling liquid, followed by alternatively rotating and counter-rotating, the invention can be used with other cooling techniques. For example, an insert such as a pipe, tube, oblong shape can be inserted into the cap portion of the larger bottles, such as the 64 ounce or 1 liter or 2 liter or 3 liter bottle, and can contain the cooling liquid sealed from the beverage inside of the beverage container. The beverage container can both rotate in the immersed cooling fluid and rotate about the insert through the cap, so that the cooling fluids substantially decrease the time for chilling the beverages in the beverage containers.

Other embodiments can allow for the larger containers, such as a 2 liter bottle, and the like, to not have to be immersed in a liquid housing, where the beverage container is in a bath effect. The invention can allow for eliminating the main housing so that the beverage containers are not immersed in any cooling liquid. The cap portions of the beverage containers, can be mounted to the motors, through the cap portions, where elongated inserts (tubes, pipes, oblong shapes) are inserted into the beverages inside of the container. The inserts would contain cooling liquids in either a stationary form or being circulated in and out of the inserts by pumps. The beverage containers would be continuously rotated and counter-rotated about the inserts.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method for rapidly chilling beverages, comprising the steps of:
providing a housing with a cooling substance inside;
immersing a beverage container in the cooling substance;
mounting via a mount the beverage container upright in the housing;
continuously and alternatively rotating and counter-rotating the mount and the beverage container between approximately 500 rpm and approximately 10,000 rpm;
switching between each of the rotating and the counter-rotating directions between approximately $1/10$ and approximately 2 seconds; and
rapidly cooling the beverage inside the beverage container to a selected cooled temperature.

2. The method of claim 1, further comprising the step of: providing a can as the beverage container.

3. The method of claim 1, further comprising the step of: providing a bottle as the beverage container.

4. The method of claim 1, wherein the step of continuously and alternatively rotating includes the step of:

continuously and alternatively rotating the beverage container between approximately 1,000 rpm and approximately 5000 rpm in both rotating and counter-rotating directions.

5. The method of claim 4, wherein the step of switching includes the step of:
switching between each of the rotating and the counter-rotating directions between approximately 3/10 of a second and approximately 1 second.

6. The method of claim 1, wherein the step of continuously and alternatively rotating includes the step of:
continuously and alternatively rotating the beverage container up to approximately 2,500 rpm in both rotating and counter-rotating directions.

7. The method of claim 6, wherein the step of switching includes the step of:
switching between each of the rotating and the counter-rotating directions between approximately 0.3 seconds and approximately 1 second.

8. The method of claim 1, further comprising the step of:
selecting the beverage containers from an 18 oz container and a 20 oz container.

9. The method of claim 1, wherein the step of rapidly cooling includes the step of rapidly cooling the beverage in the container to less than approximately 26 F in less than approximately 30 seconds.

10. The method of claim 1, wherein the step of rapidly cooling includes the step of rapidly cooling the beverage in the container to less than approximately 26 F in less than approximately 1 minute.

11. The method of claim 1, further comprising the steps of:
providing a display for a temperature input;
providing a temperature sensor for the cooling liquid;
providing a temperature sensor for the beverage container;
providing a motor for the mounted container;
inputting a selected chilled temperature for the beverage container onto the display; and
automatically alternating the rotating and the counter-rotating of the beverage container until the temperature sensor for the beverage container reaches the selected cooled temperature.

12. A rapid-spinning liquid-immersion beverage cooler system, comprising:
a housing with a cooling substance inside;
a mount supporting a container with a beverage inside of the housing in an upright position so that the beverage container is immersed in the cooling substance; and
a motor continuously and alternatively rotating and counter-rotating the mount and the beverage container in the immersed substance between approximately 500 rpm and above approximately 10,000 rpm along, while switching between each of the rotating and the counter-rotating between approximately 1/10 of a second and approximately 2 seconds, wherein the beverage inside the container is cooled to a selected cooled temperature.

13. The system of claim 12, wherein the beverage container includes: a can.

14. The system of claim 12, wherein the beverage container includes: a bottle.

15. The system of claim 12, further comprising:
a temperature sensor for the cooling substance;
a temperature sensor for the beverage container;
a display for a temperature input, so that a selected chilled temperature is inputted onto the display, and the motor automatically alternates between the rotating and the counter-rotating of the beverage container until the temperature sensor for the beverage container reaches the selected cooled temperature.

16. The system of claim 15, further comprising:
a beverage container size indicator on the display so that a selected beverage container size is inputted onto the display.

17. The system of claim 12, further comprising:
a second mount for supporting a second container with a beverage inside of the housing so that the second beverage container is immersed in the cooling substance, and wherein the motor is used for alternatively rotating and counter-rotating the second beverage container in the immersed liquid until the beverage inside the second container is cooled to the selected cooled temperature.

18. A device for rapidly cooling beverage containers, comprising:
a housing having a cooling substance inside, the cooling substance being pre-cooled;
a mount supporting a beverage container which holds a beverage, inside of the housing upright so that the beverage container is immersed in the cooling substance; and
a motor alternatively rotating and counter-rotating the mount and the beverage container in the immersed substance between approximately 500 rpm and approximately 10,000 rpm, while continuously switching between the rotating and the counter-rotating directions between approximately 1/10 of a second and approximately 2 seconds, wherein the beverage inside the beverage container is cooled to a selected cooled temperature.

19. The device of claim 18, wherein the mount supports a can or a bottle as the beverage container.

20. The device of claim 18, further comprising:
a temperature sensor for the cooling substance;
a temperature sensor for the beverage container;
a display for a temperature input, so that a selected chilled temperature is inputted onto the display, and the motor automatically alternates between the rotating and the counter-rotating of the beverage container until the temperature sensor for the beverage container reaches the selected cooled temperature.

* * * * *